United States Patent [19]

Ajmera et al.

[11] Patent Number: 4,839,127
[45] Date of Patent: Jun. 13, 1989

[54] METHOD OF MAKING PARTIALLY CRYSTALLINE BIAXIALLY ORIENTED HOLLOW PLASTIC HEAT SET CONTAINERS

[75] Inventors: Prakash R. Ajmera, Toledo; Saleh A. Jabarin, Holland, both of Ohio

[73] Assignee: Owens-Illinois Plastic Products Inc., Toledo, Ohio

[21] Appl. No.: 21,894

[22] Filed: Mar. 4, 1987

[51] Int. Cl.$^4$ .............. B29C 49/18; B29C 49/30; B29C 49/32

[52] U.S. Cl. ........................ 264/526; 264/528; 264/530; 264/537; 264/542; 425/530; 425/534; 425/538

[58] Field of Search ............. 264/521, 523, 528, 529, 264/530, 535, 542; 425/530, 534, 538, 326.1, 387.1, 397, 539

[56] References Cited

U.S. PATENT DOCUMENTS

| | | | |
|---|---|---|---|
| 4,066,726 | 1/1978 | Mehnert | 264/530 |
| 4,224,263 | 9/1980 | Kontz | 264/521 |
| 4,385,089 | 5/1983 | Bonnebat et al. | 264/523 |

*Primary Examiner*—Jan H. Silbaugh
*Assistant Examiner*—Neil M. McCarthy

[57] ABSTRACT

A method for making a partially crystalline, biaxially oriented heat set hollow plastic container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at heat setting temperature, expanding the plastic parison within the hot mold and mold base by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, lowering the internal pressure in the container, opening the hot mold while maintaining engagement of the open end and engagement of the mold base with the blown hollow container, maintaining a lower internal pressurization of the container to prevent significant shrinkage, and cooling the container while maintaining engagement of the open end and engagement of the mold base with the container and maintaining pressure in the container at least sufficient to prevent shrinkage.

20 Claims, 12 Drawing Sheets

METHOD OF MAKING PARTIALLY CRYSTALLINE BIAXIALLY ORIENTED HOLLOW PLASTIC HEAT SET CONTAINERS

This invention relates to making hollow biaxially oriented heat set partially crystalline articles and particularly articles made of polyethylene terephthalate.

BACKGROUND AND SUMMARY OF THE INVENTION

It has heretofore been known that the thermal stability and barrier properties of oriented blow molded containers of polyethylene terephthalate are significantly increased by heat setting. Typical processes for heat setting are shown in U.S. Pat. Nos. 4,476,170, 4,512,948 and 4,522,779.

In U.S. Pat. Nos. 4,476,170 and 4,512,948, there is disclosed an article and a process of making an oriented and heat set blow molded container of polyethylene terephthalate. In the process, a perform preheated to a temperature suitable for orientation is biaxially stretched in a blow mold and then while the hollow container is still in contact with the blow mold walls, the article is raised to a higher heat setting temperature preferably in the range of 200°–250° C. (except for the neck) thus heat setting the container, and while the container is still at a shrinkage resisting pressure exceeding atmospheric, it is cooled in the same mold to a temperature at which it maintains its shape when not pressurized but not below 100° C. It is also particularly disclosed that this cooling step can be done in the air outside the mold while maintaining internal pressure. According to these patents, when the heat setting temperature of the hot mold ranges from 220°–250° C. and the quenching temperature is not below 100° C., higher onset-of-shrinkage temperatures are obtained.

In U.S. Pat. No. 4,522,779, there are disclosed improved plastic containers and a process for their production. In the first embodiment, a container is blow molded in a first hot blow mold, then reblown to a larger size in a second cold mold of larger volume than the first hot mold. Such containers are stated as having improved mechanical properties, particularly very high hoop yield stresses. However, the utilization of a larger volume cold mold substantially reduces the thermal stability. In the second embodiment, a container is blow molded in a hot blow mold, then reblown to a larger size in a second hot blow mold where it is blown to the confines of the second mold and the container is then removed from the second hot mold and transferred to a third cold mold and cooled to room temperature while maintaining internal pressure. In a further embodiment, the container is blow molded in a first hot mold, reblown in a second hot mold, and thereafter the second mold is cooled to cool the container.

U.S. Patent No. 4,385,089 (British Patent Specification 1,604,203) is directed to heat set biaxially oriented hollow articles and states that the preform or parison should be heated at least to biaxially orientation temperature and maintained in closed contact with a hot mold which is at a temperature of up to 40° C. above the minimum orientation temperature. In one embodiment, the resultant molded hollow article is moderately cooled causing a temperature drop of 10°–30° C. by introducing cooling vapor or mist into the hollow article, interrupting the cooling vapor, and opening the mold. In another embodiment, the heat set article is allowed to shrink freely and then reblown in the same hot mold or in a separate cooled mold. The patent calls for a heat setting temperature of 40° C. above the orientation temperature which limits thermal stability and barrier properties.

According to this patent, the temperature of the hot mold should be maintained between 30° and 50° C. above the minimum orientation temperature of the plastic material. Otherwise, it is stated there are numerous disadvantages including lowering of the production rate, the danger of the appearance of major distortion and major shrinkage on mold release, the disadvantage inherent in heating metal molds to very high temperatures and keeping them at such temperatures, and the danger of crystallization which would cause a loss of transparency. Further, in accordance with this prior patent, excessive shrinkage is to be avoided and generally the temperature drop of 10° to 30° C. should be made. Accordingly, such a method precludes obtaining a degree of heat setting which would produce thermal stability at higher temperatures as may be required in filling the container with various products. In addition, such a method will preclude obtaining the higher degrees of crystallinity and resultant high barrier properties which are required for some products.

In copending application Ser. No. 923,503, filed Oct. 27, 1986, there are disclosed improved plastic containers and a method for their manufacture. In this method, the container is blow molded in the first hot mold which is maintained at 130°–250° C., the container is in contact with the mold surface for a short period of time (1–10 sec.) which is sufficient to induce partial crystallization. The container is then maintained at lower internal pressure to prevent significant shrinkage and then the container is rapidly transferred into a cold mold having substantially the same volume or smaller volume than the hot mold. The temperature of the cold mold is maintained at 1°–100° C. The container is quenched in the cold mold. The method results in a thermally stable container which has higher onset-of-shrinkage temperature and higher mechanical properties as required for hot fill applications. The method also provides lower cycle time.

Where the blown container is moved rapidly from a hot blow mold to a cold mold, the container will become deformed by tilting relative to the finish or neck by which it is held. In addition, where the base of the container is complex such as having axially projecting portions so that it is free standing or has an inverted bottom, the transfer, while the interior of the container is under pressure, tends to deform the bottom and cause it to revert to a hemispherical bottom. This tends to occur both when the blown container is maintained stationary and when the container is moved from a hot mold to a cold mold.

Accordingly, among the objectives of the present invention are to provide a method for heat setting containers which will obviate deformation of the bottom and permit the container to be transferred more rapidly between the hot mold and the cold mold, thereby reducing the cycle time.

In accordance with the invention, the method for making a partially crystalline, biaxially oriented heat set hollow plastic container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at heat setting temperature, expanding the plastic parison within the hot mold and mold base by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, lowering the internal pressure in the container, opening the hot mold while maintaining engagement of the open end and engagement of the mold base with the blown hollow container, maintaining a lower internal pressurization of the container to prevent significant shrinkage, and cooling the container while maintaining engagement of the open end and engagement of the mold base with the container and maintaining pressure in the container at least sufficient to prevent shrinkage.

In a preferred form, the parison is heated to the orientation temperature and maintained for a given period of time at that temperature in order to equilibrate the inside and outside temperature of the parison, the parison is placed on a neck clamping and blow pin assembly and transferred to a hot blow molding station and a mold base is shifted into position and the hot mold is closed about the clamping and blow pin assembly and mold base, the parison is blown through the neck and heat set for a given period of time, the blowing pressure is then reduced to a lower transfer pressure, the hot mold is opened, and the mold base and clamping and blow pin assembly through which it has been blown are moved together to transfer the blown article to a cold mold, the cold mold is closed about the mold base, neck clamping and blow pin assembly and container and the container is pressurized to a higher pressure than the transfer pressure, quenched, and then the pressure is exhausted to atmosphere pressure, after which the cold mold is opened, the article removed, and the mold base is returned with the clamping mechanism to the initial position. Alternatively, the mold base and clamping assembly are maintained stationary and the hot and cold molds are moved into coacting relationship with the mold base and clamping assembly.

DESCRIPTION

Figure 1:
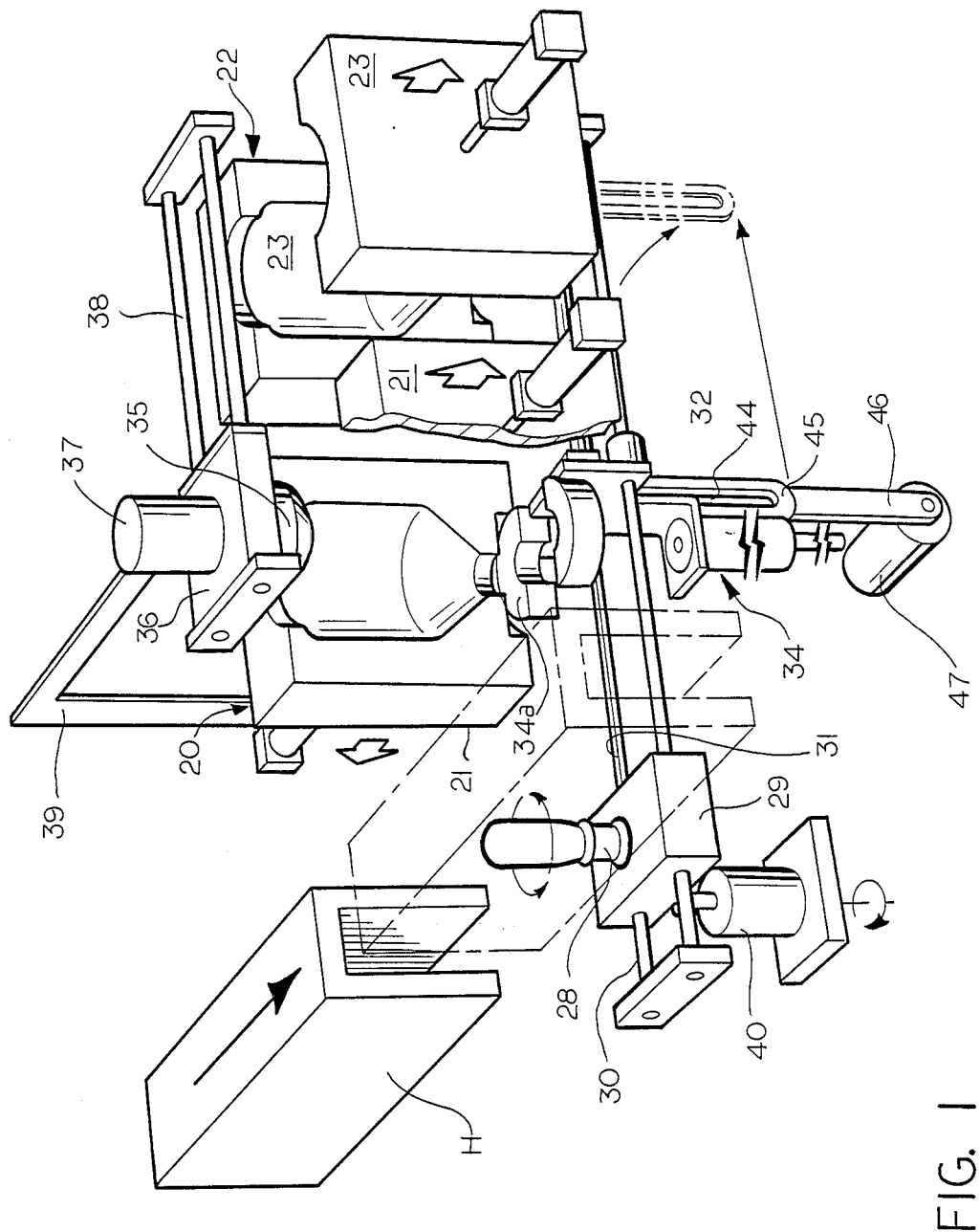
FIGS. 1-4 are partly diagrammatic views of an apparatus for performing the method comprising the invention, parts being broken away.
Figure 2:
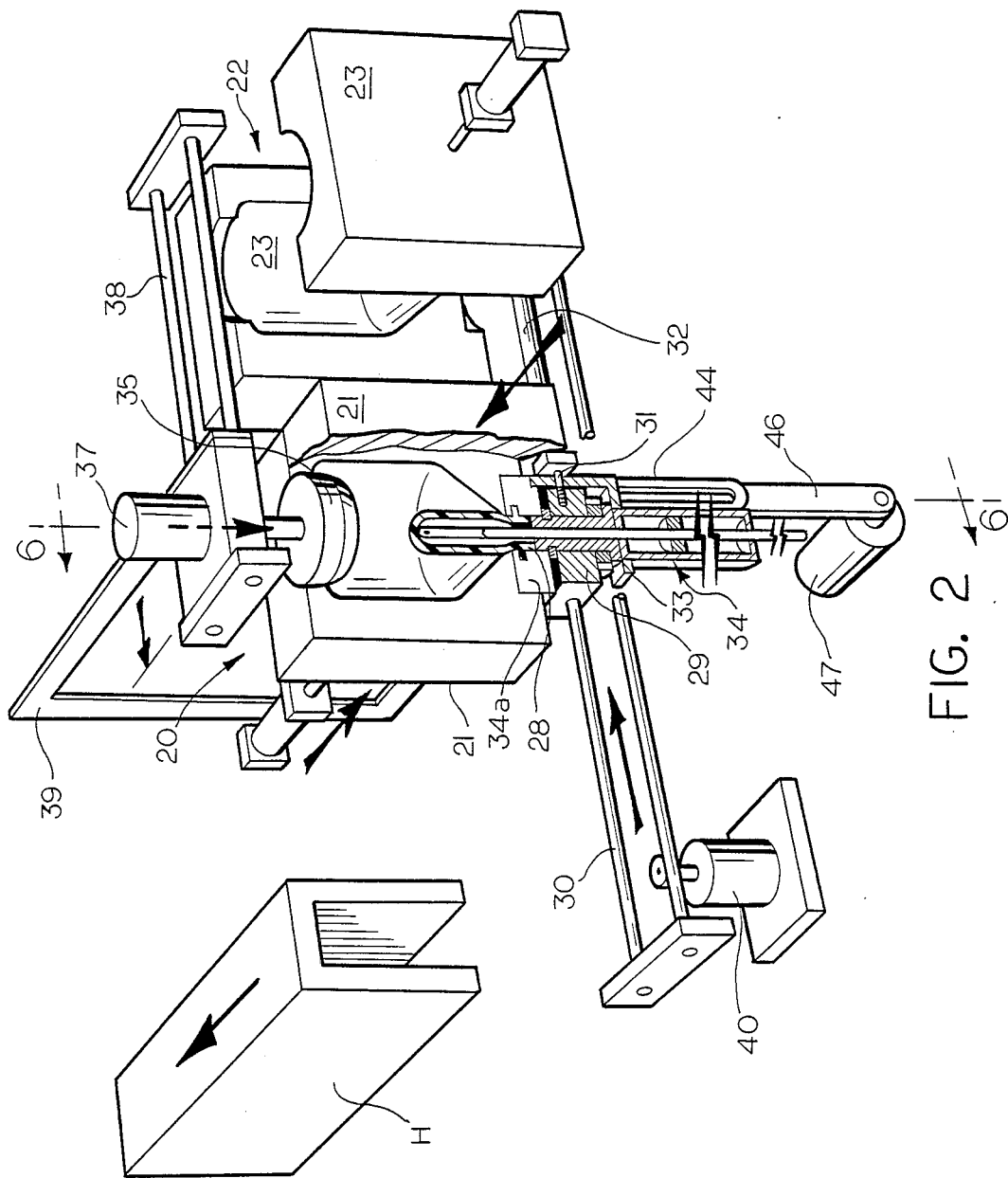
Figure 3:
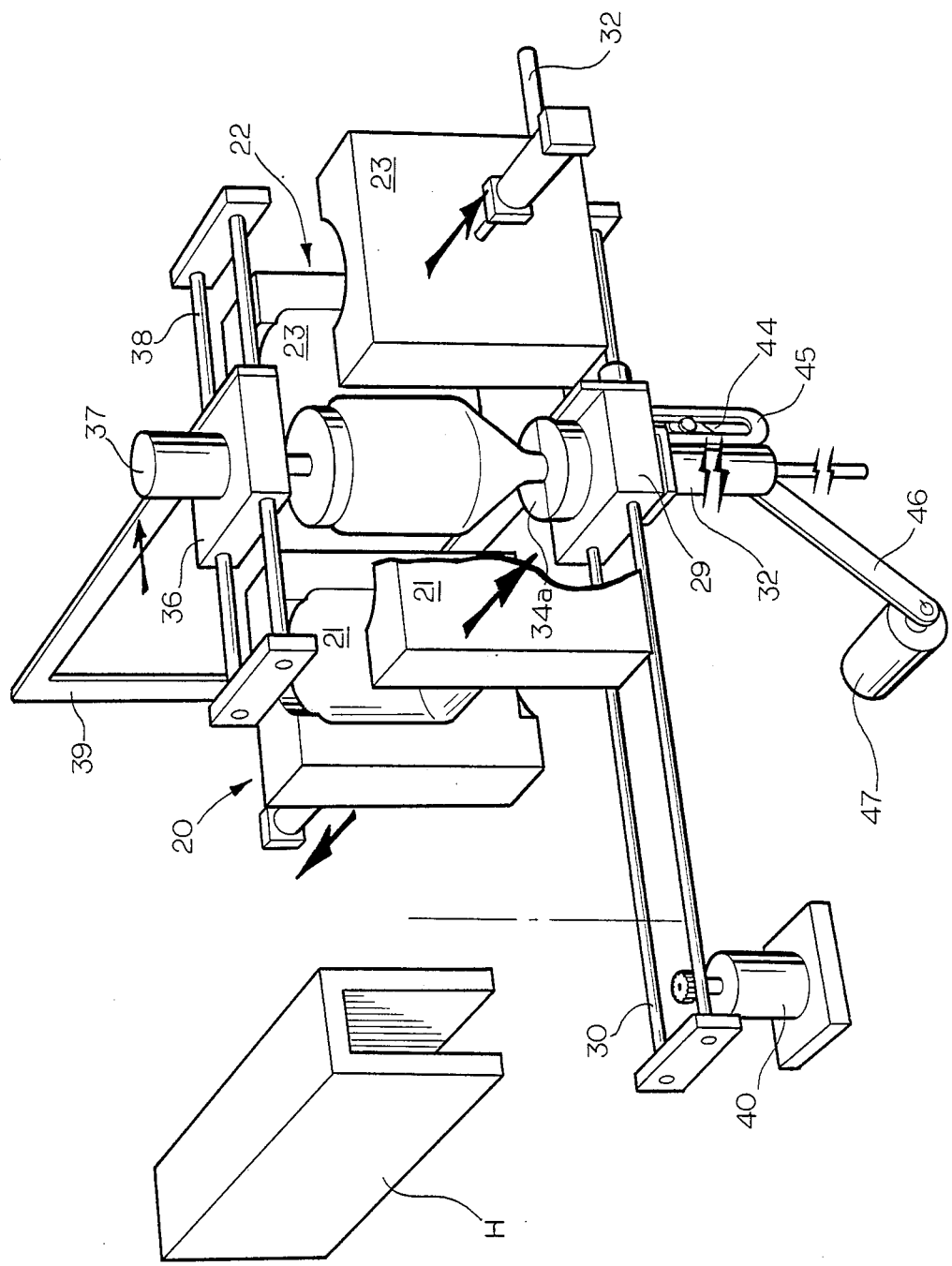
Figure 4:
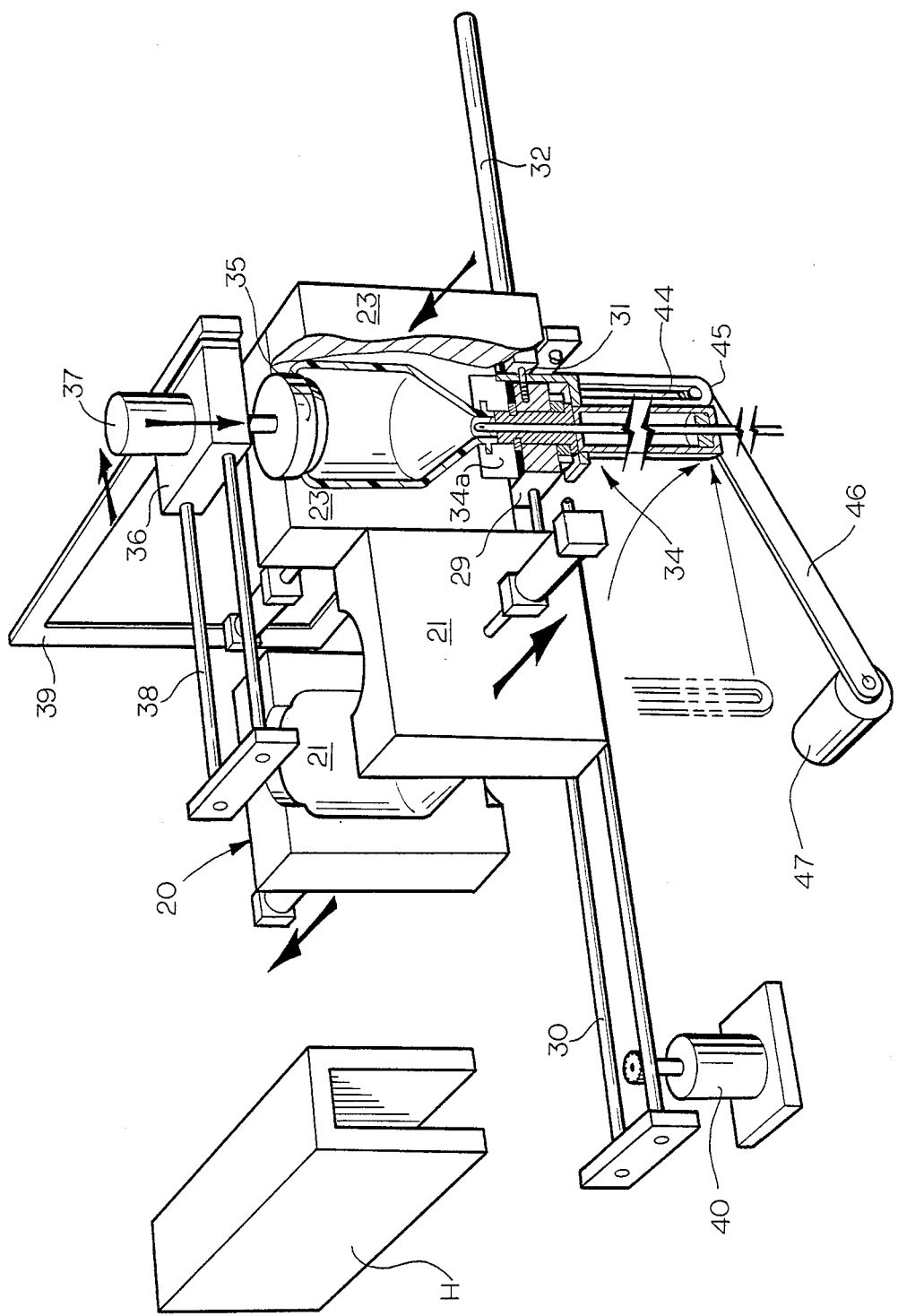
Figure 6:
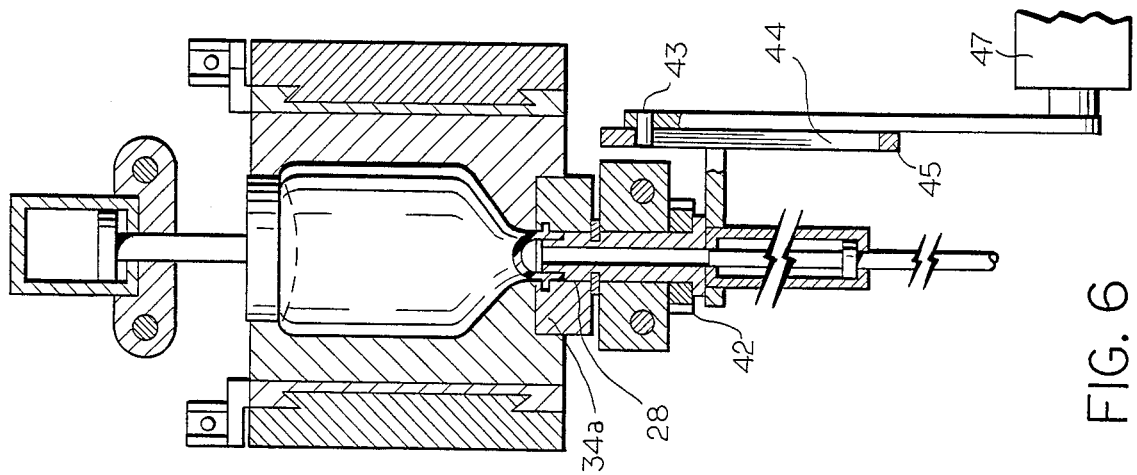
FIG. 6 is a fragmentary sectional view taken along the line 6—6 in FIG. 2, showing the hot mold closed.
Figure 5:
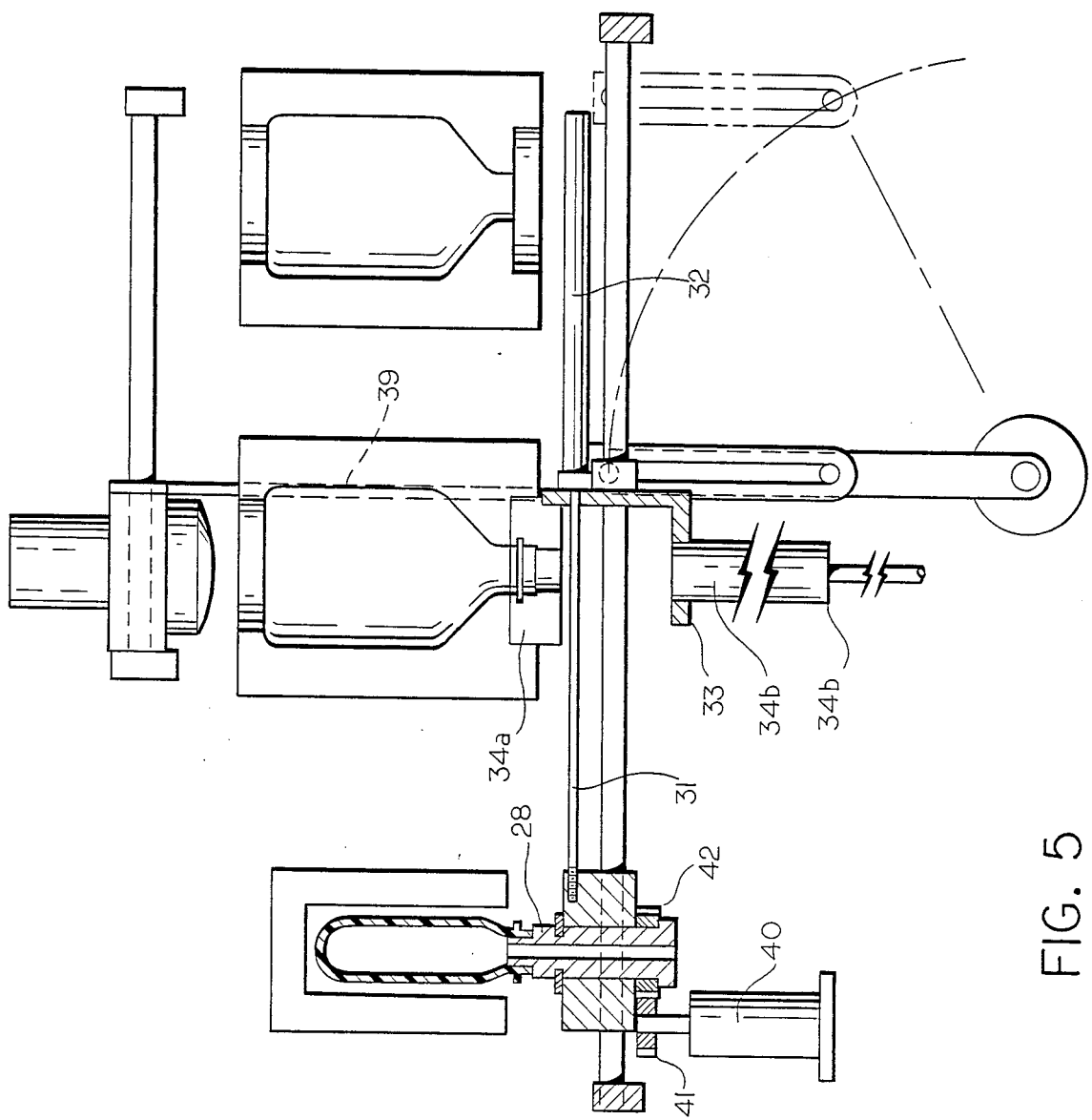
FIG. 5 is a longitudinal sectional view of the apparatus.
Figure 7:
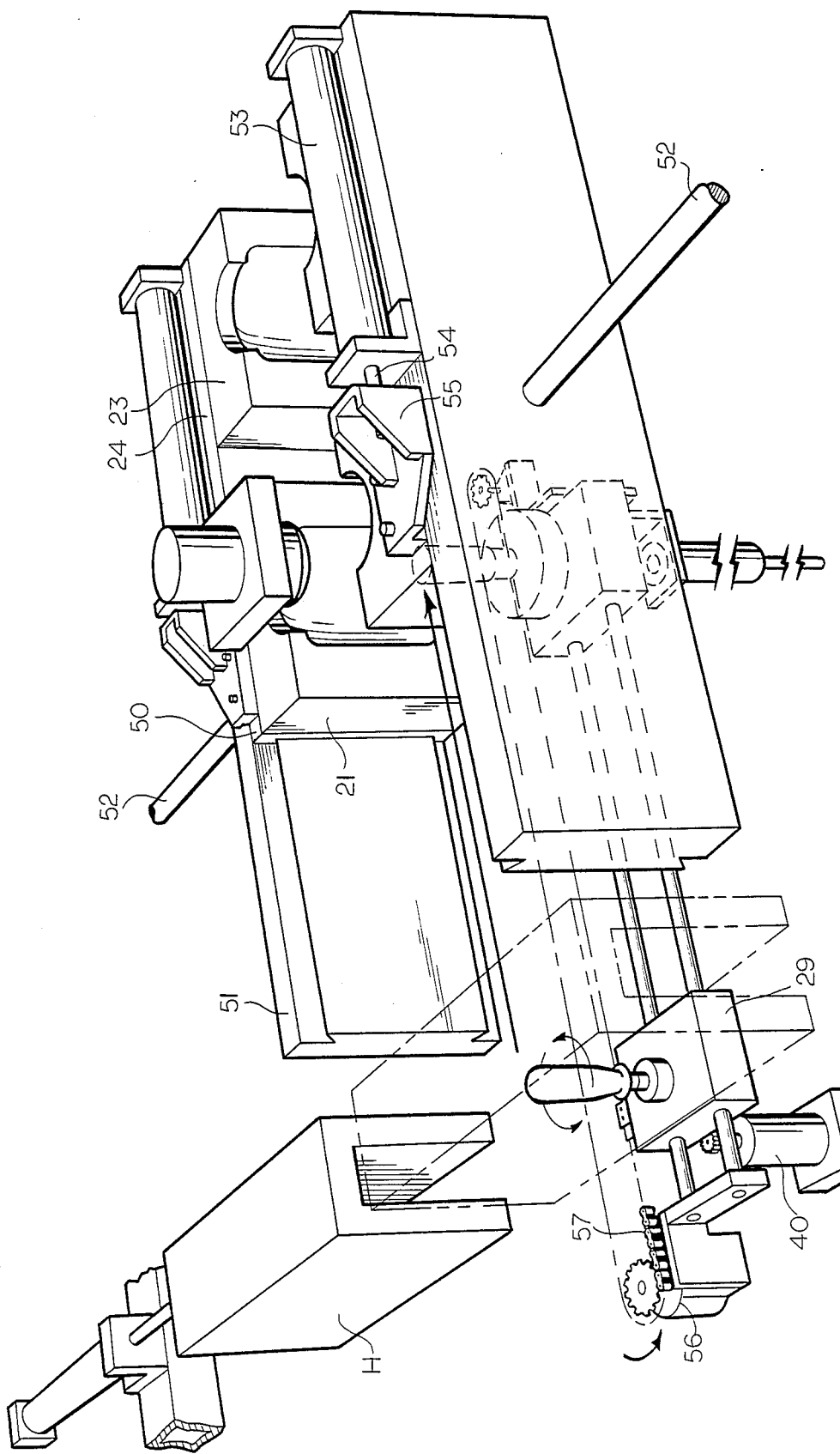
FIGS. 7-11 are partly diagrammatic views of an apparatus for performing a modified form of the method.
Figure 8:
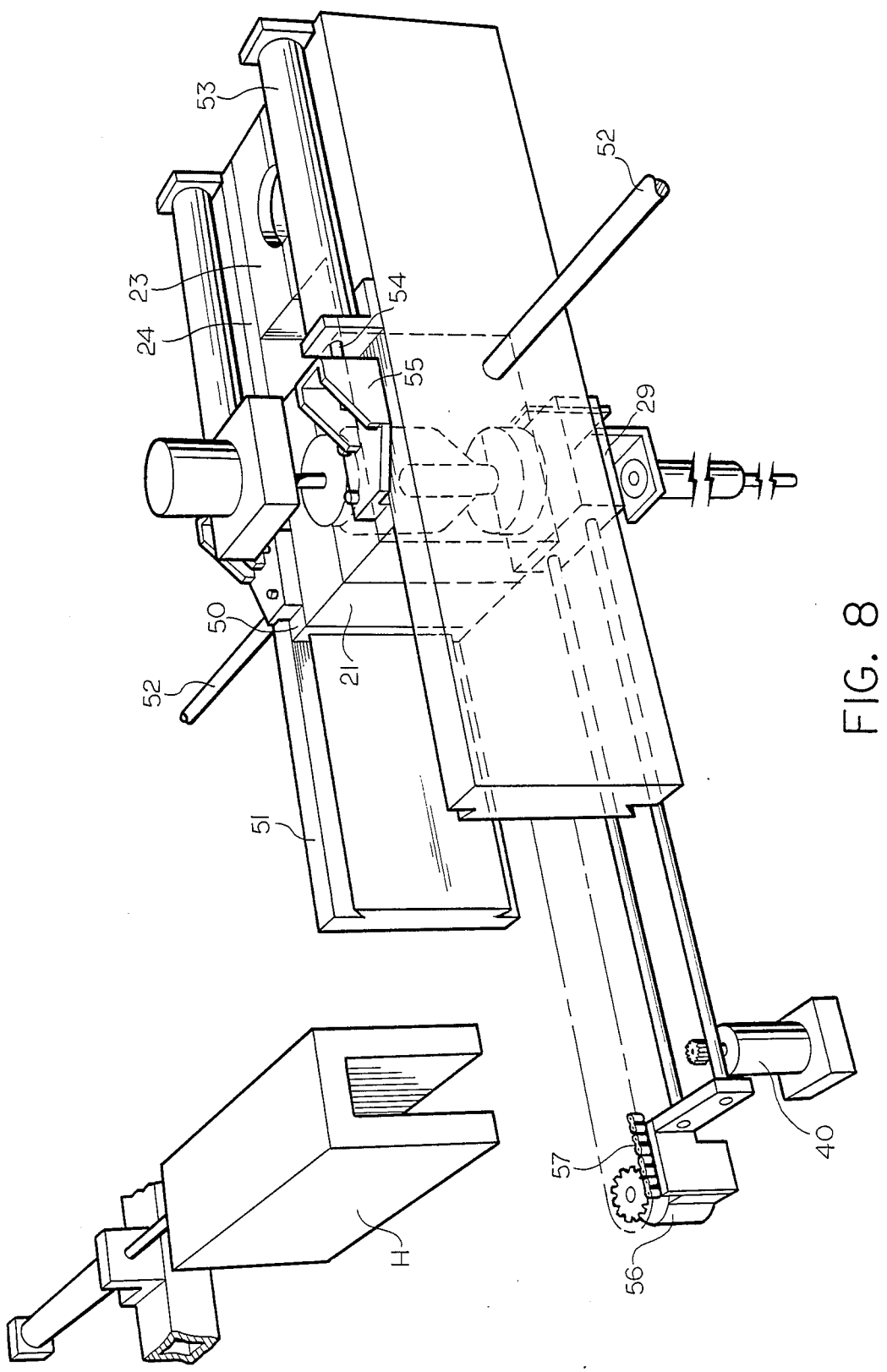
Figure 9:
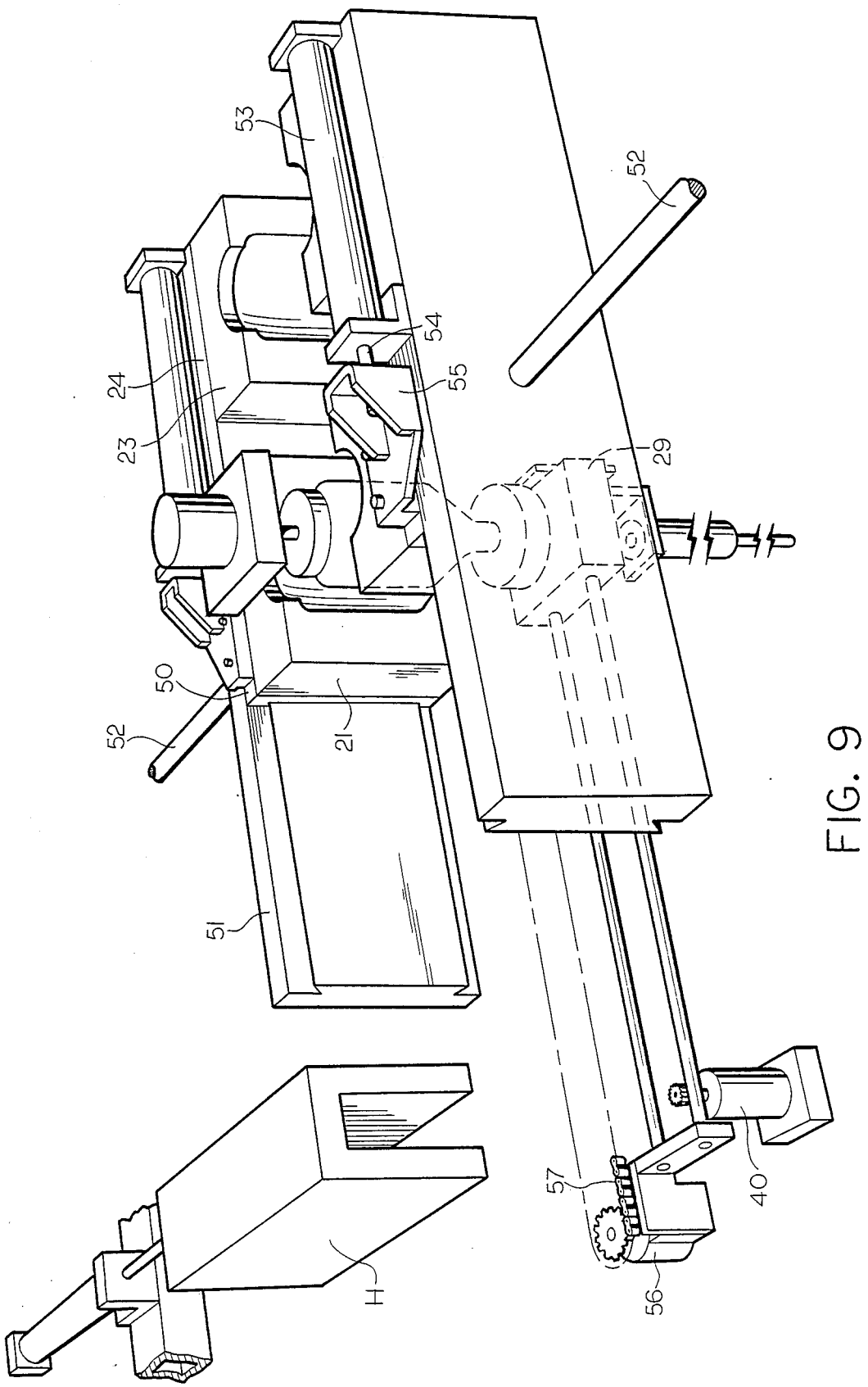
Figure 10:
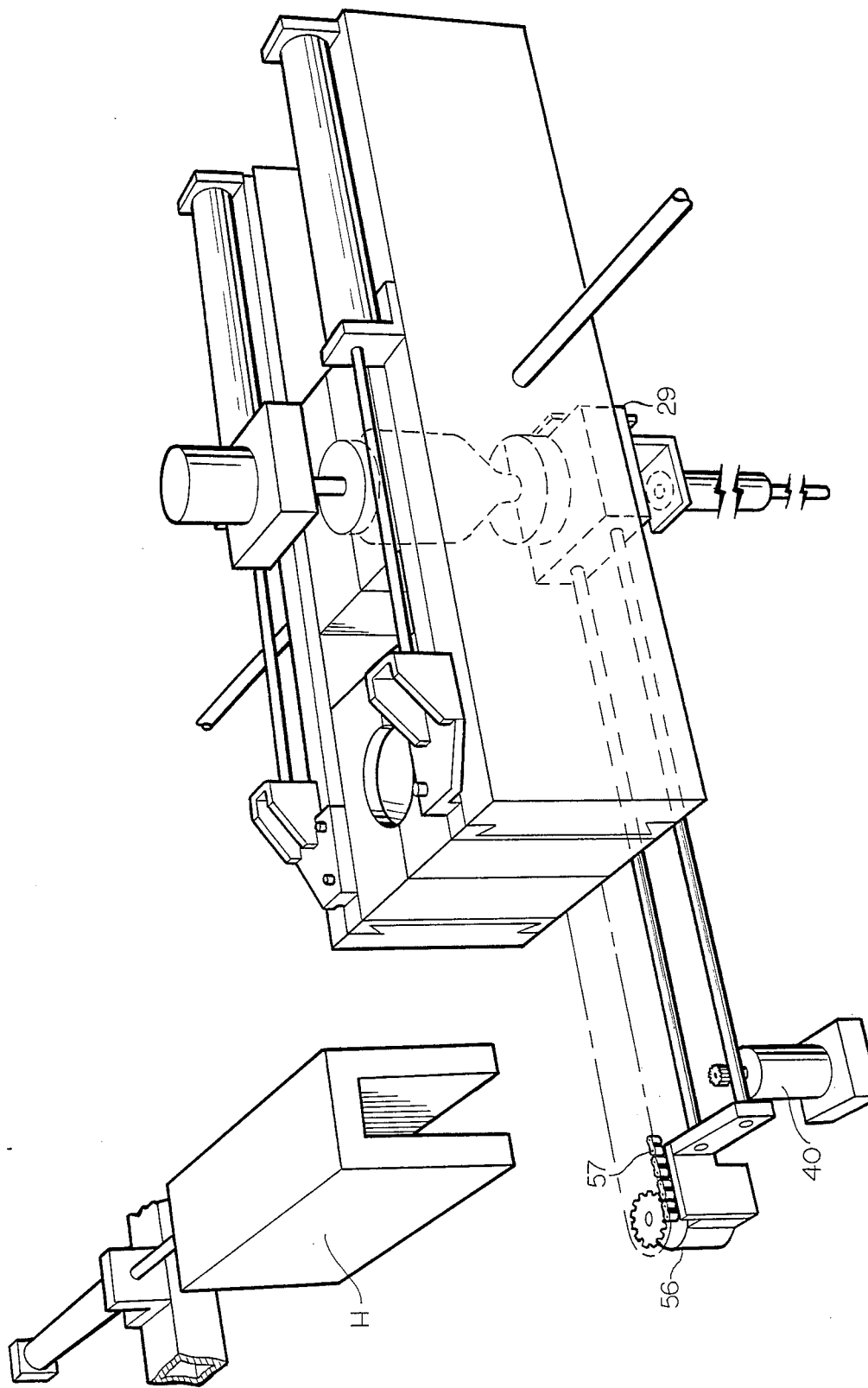
Figure 11:
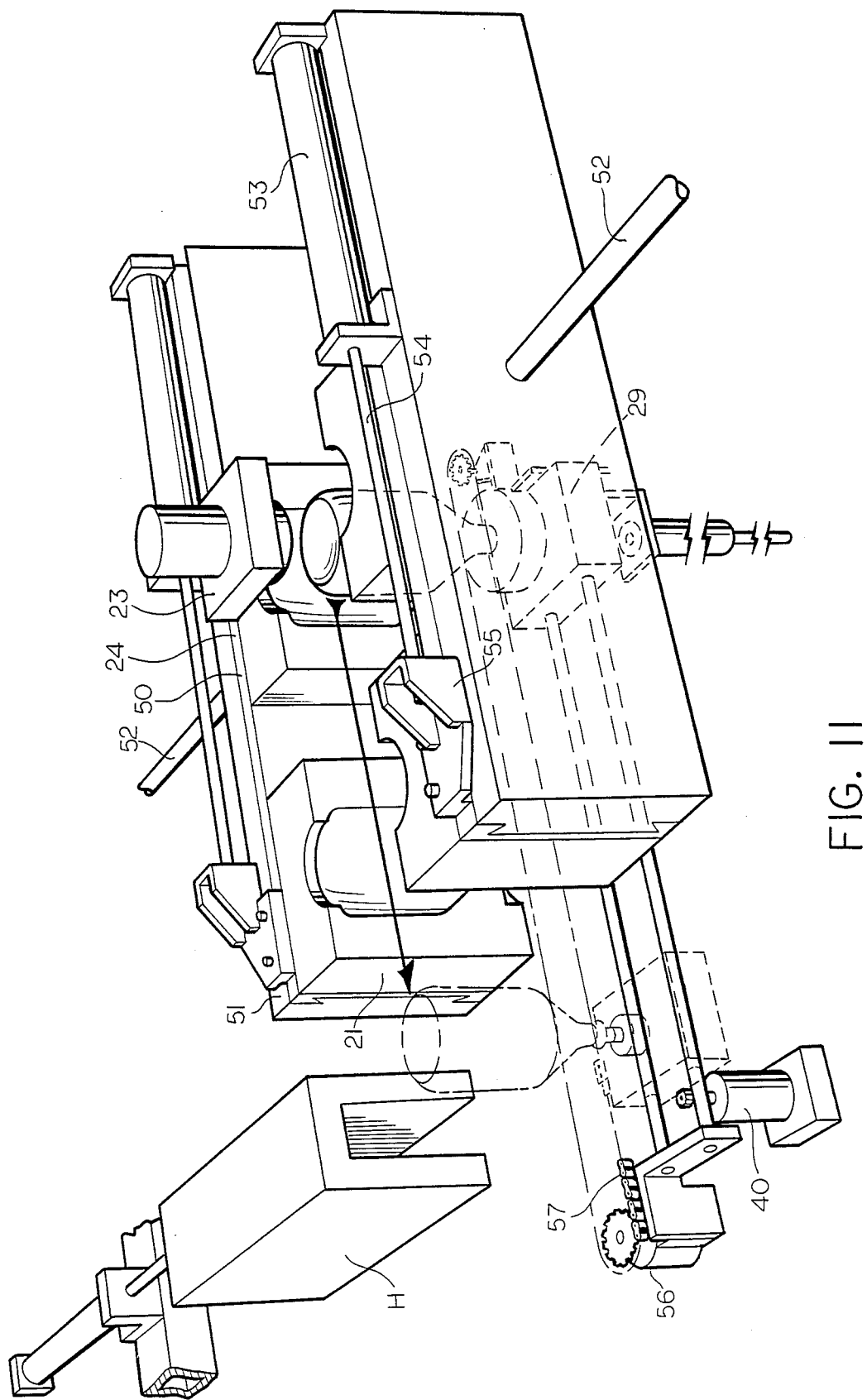
Figure 12:
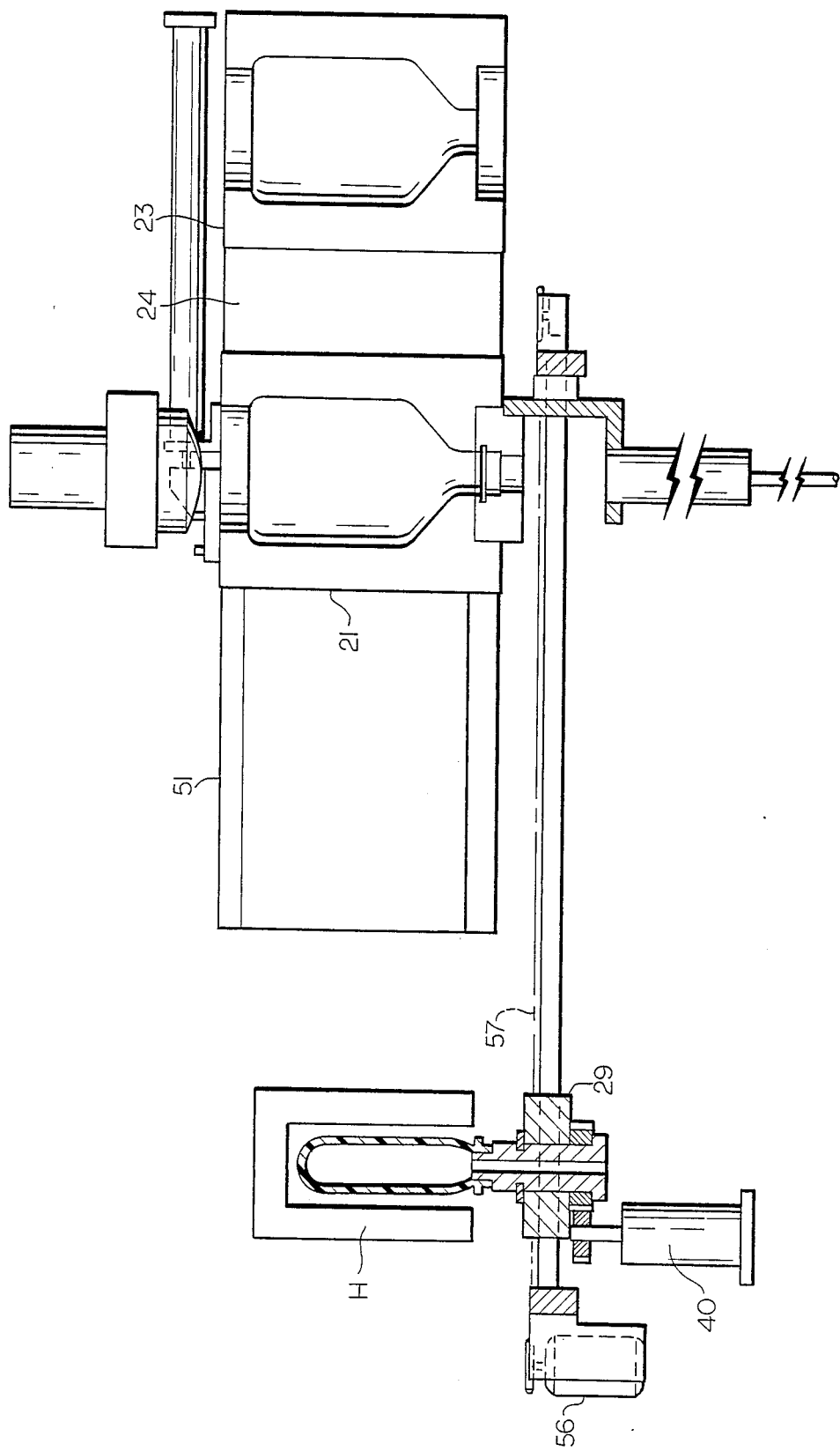
FIG. 12 is a fragmentary sectional view of the modified apparatus.

Referring to FIGS. 1-6, an apparatus embodying the invention comprises a stationary sectional hot mold 20 which comprises sections 21 movable toward and away from one another by suitable apparatus such as pneumatic cylinders (not shown). The mold 20 is adapted to be heated so that when a parison is blown to the confines of the mold cavity, the resultant article is also heat set. The apparatus further includes a cold mold 22 that has mold sections 23 movable toward and away from one another by suitable apparatus to form a cavity substantially identical in size to the cavity of the mold 20.

The apparatus includes a conditioning station A at which a parison or preform P supported on a mandrel 28 is positioned for heating and equilibrating the parison to an orientation temperature. The apparatus further includes a blowing and heat setting station B at the hot mold 20 and a quenching station C at the position of cold mold 22.

A mandrel 28 supporting a parison P is mounted on a block 29 movable on a track 30 defined by spaced rods. The block 29 is connected to a piston rod 31 of a cylinder 32 mounted on a bracket 33 on which a clamping and blow pin assemby 34 is mounted. The bracket 33 is also mounted for movement on track 30. The clamping and blow pin assembly 34 comprises the halves of a clamp ring 34a and a blow pin assembly 34b. The neck clamping halves are opened and closed by a fluid cylinder as is well known in the art.

Mold base 35 is attached to a mold base support 36 and provided with a cylinder 37 for moving the mold base 35 axially toward and away from a mold. The mold base support 36 is movable along a track 38.

The mold base support 36 and a clamping and blow pin assembly 34 are interconnected by a link 39 for movement longitudinally on the tracks 30, 38. A cylinder 40 at station A is adapted to rotate a pinion 41 which engages a gear 42 on the mandrel 28 to rotate the mandrel 28 at station A. A rotary cylinder 47 provides oscillating movement of an arm 46 which has a pin 43 thereon engaging a slot 44 in a link 45 fixed on bracket 33 to translate the bracket 33 and clamping and blow pin assembly 34 along track 30 between stations B and C.

Initially, a parison P is placed at position A on mandrel 28 and is heated to the orientation temperature in a heating channel H and allowed to soak for a given period of time in order to equilibrate the inside and outside temperature of the parison. The cylinder 32 is then actuated to bring the parison P to the hot blow molding and heat setting station B. The mold base cylinder 37 is then actuated to position the mold base 35 within the mold sections 21, the mold 20 is closed about the mold base 35 and neck clamp 34a. The parison is extended by fluid pressure through the blow pin assembly 34b to the confines of the hot mold 20 to produce a biaxially oriented container. The blowing fluid is first applied at a lower pressure, for example, 70 to 200 p.s.i., and then the blowing fluid is applied at a higher pressure, for example, 150 to 350 p.s.i., to maintain contact between the container and the surface of the mold. The contact with the confines of the mold is maintained by maintaining the internal pressurization for a given period of time to heat set the container. The blowing pressure is then reduced to a lower transfer pressure, the hot mold 20 is opened and the mold base 35 and clamping and blow pin assembly 34 are moved in unison to the quenching station C. During the transfer of the blown article to the cold mold, mold base 35 remains down and the article is maintained in stable controlled condition with the interior of the container under pressure, thus minimizing any tendency of the bottom of the container to deform or revert to a hemispherical bottom. At the quenching station, the container is reblown and held against the confines of the cold mold 22 by the pressure and quenched while maintaining the pressure within the container. The pressure in the container is then exhausted. The cold mold 22 is then opened, and the mold base cylinder 37 is actuated to move the mold base and cylinder assembly axially and then mold base 35 and clamping and blow pin assembly 34 are returned to position B and mandrel 28 is returned to position A along with the container and then the container is removed.

In the modified method as shown in FIGS. 7-12, the mold base support 36 and clamping and blow pin assembly are maintained stationary while the hot mold 20 and cold mold 22 are moved longitudinally to transfer the blown container from the hot mold to the cold mold. In this form, the mold halves 21, 23 are mounted on a slide 50 which in turn is mounted on a platen 51. The platens are moved transversely in and out of position to open and close the molds by cylinders, not shown, the shafts 52 of which are shown. The movement of the slide along the platen 51 is achieved by a cylinder 53 which has its piston rod 54 connected by a bracket 55.

In this form, the transfer of the mandrel base 29 between the parison heating station A and the blowing and heat setting station B is achieved by a reversible electric motor 56 which drives a chain 57 connected to the mandrel base 29 to move it between positions A and B.

In all other respects the method is substantially similar and the same cycle is provided.

Figure 14:
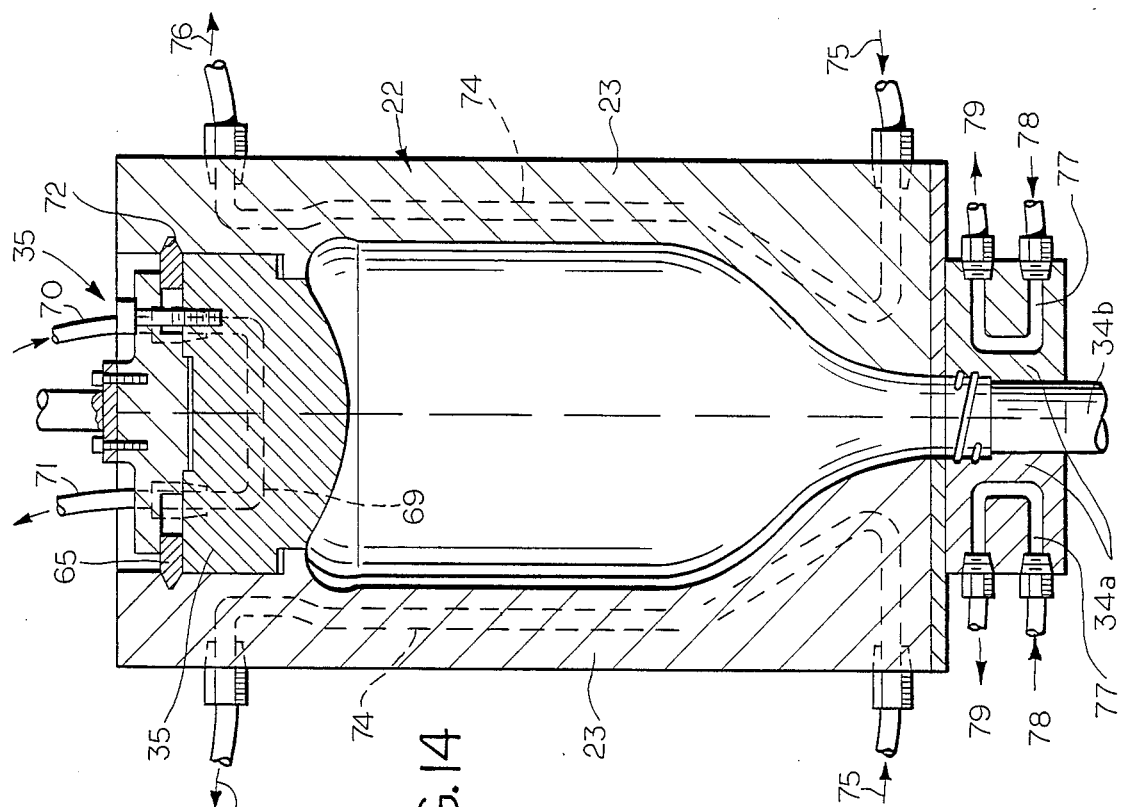
FIG. 14 is a sectional view of a cold mold which may be used with the method.
Figure 13:
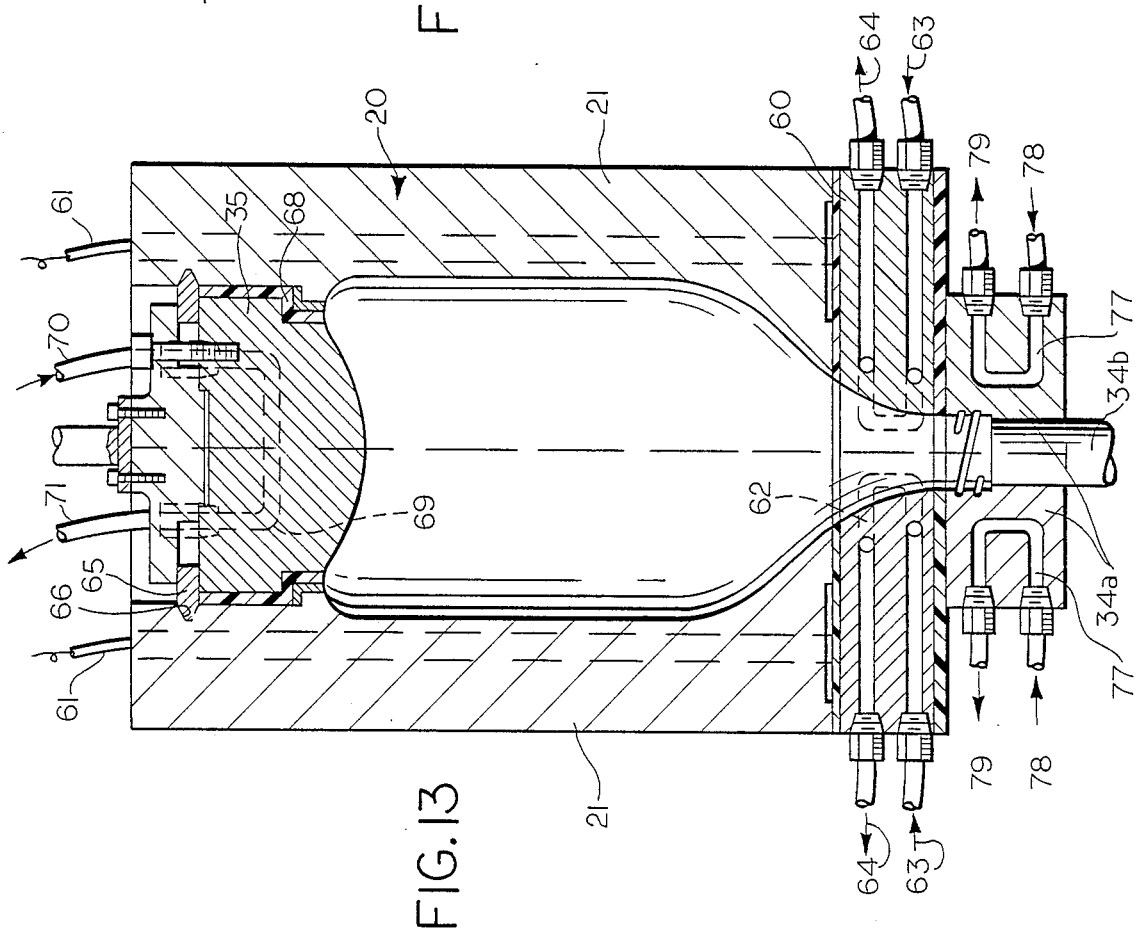
FIG. 13 is a sectional view of a hot mold that can be used in performing the method, parts being broken away.

The specific hot and cold molds 20, 22 may have the construction as shown in FIGS. 13 and 14 respectively. Referring to FIG. 13, the mold 20 includes the mold halves 21, a shoulder forming portion 60, the clamping ring halves 34a and the mold base 35. The mold halves 21 are provided with circumferentially spaced longitudinally extending electric heaters 61. The mold part 60 is provided with coolant passages 62 in each half having an inlet 63 and an outlet 64. The mold base 35 has an annular ring 65 which engages semi-circular grooves 66 fixed to the upper end of the mold halves 21. An insulator in the form of a Teflon layer 68 is provided between the mold halves 21 and the mold base 35. Finally, the mold base 35 is provided with a passage 69 having an inlet 70 and an outlet 71 for the passage of fluid to control the temperature of the mold base. Each half of the finish clamp 34a is provided with a passage 77 having an inlet 78 and an outlet 79 for the passage of fluid to control the temperature of the clamp.

The cold mold 22 shown in FIG. 14 similarly comprises the cold mold halves 23 of the cold mold 22 on the lower end of which are provided at station C the clamp rings 34a and blow pin assembly 34b and at the upper end of which the mold base is enclosed with the mold as in FIG. 13. In this form, the ring 65 engages semi-circular grooves 72 in the upper end of the mold halves 23 and no insulating layer is provided. Each half of the cold mold 22 is provided with a passage 74 having an inlet 75 and outlet 76 for the passage of fluid to control the temperature of the cold mold.

The process of the present invention is applicable to polymers which are capable of being biaxially oriented when blown at orientation temperatures and subsequently heat set at higher heat setting temperatures to make the resultant hollow article thermally stable.

The process of the present invention, as well as the product, is especially concerned with polymers of polyethylene terephthalate having an inherent viscosity of at least 0.6. Polyethylene terephthalate polymers useful in the present invention include repeating ethylene terephthalate units with the remainder being minor amounts of ester-forming components and copolymers of ethylene terephthalate wherein up to about 10 mole percent of the copolymer is prepared from the monomer units selected from butane-1,4-diol; diethylene glycol; propane-1,3-diol; poly tetramethylene glycol); poly ethylene glycol); poly(propylene glycol); 1,4-hydroxymethylcyclohexane and the like, substituted for the glycol moiety in the preparation of the copolymer, or isophthalic; naphthalene 1,4- or 2,6-dicarbocylic; adipic; sebacic; decane-1,10-dicarboxylic acids, and the like, substituted for up to 10 mole percent of the acid moiety (terephthalic acid) in the preparation of the copolymer.

Of course, the polyethylene terephthalate polymer can include various additives that do not adversely affect the polymer. For instance, some such additives are stabilizers e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the polyethylene terephthalate.

The process is also applicable to multilayer parisons comprising an orientable heat settable polymer and other polymers which provide desirable barrier properties wherein the orientable heat settable polymer comprises a major portion of the total weight, preferably at least 70%. Typical examples are multilayer parisons of polyethylene terephthalate and copolyester; polyethylene terephthalate, nylon and copolyester; polyethylene terephthalate, adhesive, nylon, glue and polyethylene terephthalate.

The process is also applicable to blends of polyethylene terephthalate with polymers which provide desirable barrier properties wherein the polyethylene terephthalate comprises a major portion of the total weight, preferably at least 70% of the total weight.

Thus, as used herein in the specification and claims, the term polyethylene terephthalate is intended to include the above polyethylene terephthalate containing materials.

When the plastic material is polyethylene terephthalate, typically, the hot mold is maintained at a temperature ranging between about 120° C. and 250° C. and the cold mold is maintained at a temperature ranging between about 1° C. and about 100° C.

Where polyethylene terephthalate is used, the following parameters produce optimum results.

TABLE I

| Heatset Parameters | |
|---|---|
| 1. Heatset temperature | 120–250° C. |
| 2. Heatset time | 1–10 seconds |
| 3. Transfer pressure | 1–30 p.s.i. |
| 4. Transfer time | 0.8–15 seconds |
| 5. Quench temperature | 1–100° C. |
| 6. Quench time | 0.5–10 seconds |

If the base of the container is oriented, then the base can be heat set at higher temperatures. In that case, the temperature of the base can be as high as the side wall temperature. If the bottom of the container is not oriented or slightly oriented and it can not be heated to higher temperatures, the temperature of the base should be lower than 160° C.

The base of the container can be hemispherical or complex such as free standing. In the following example, the containers were formed with a free standing base.

EXAMPLE

In a typical example utilizing polyethylene terephthalate having an I.V. of 0.8 and hot and cold molds, as shown in FIGS. 13 and 14, wherein the volume of the hot mold and the volume of the cold mold are the same, the following process conditions were observed and properties were achieved:

| Process Condition | | |
| --- | --- | --- |
| Molds shuttled, clamping assembly stationary | | |
| Heatset Temp, °C. | | 230° C. |
| Heatset time, sec | | 5 sec |
| Transfer pressure, psig | | 18 |
| Transfer time, sec | | 4 |
| Quench temperature | | 25° C. |
| Quench time, sec | | 5 sec |
| Mechanical Properties | Axial | Hoop |
| Elastic modulus, kpsi $\bar{x}$ | 423 | 659 |
| $\sigma$ | 27 | 64 |
| Yield stress, kpsi $\bar{x}$ | 14.4 | 26.8 |
| $\sigma$ | 0.7 | 0.7 |
| Yield strain, % $\bar{x}$ | 5.6 | 6% |
| $\sigma$ | 0.6 | — |
| Ultimate strength, kpsi $\bar{x}$ | 14.4 | 47.7 |
| $\sigma$ | 0.5 | 3.6 |
| Ultimate elongation, % $\bar{x}$ | 141 | 18 |
| $\sigma$ | 88 | 2 |
| Density | | |
| Density along the side wall at 25° C., g/cc. | | |
| Position 1 | 1.3950 | |
| Position 2 | 1.3955 | |
| Onset of Shrinkage | | |
| Onset of shrinkage temperature, °C. | 110° | |

Thus, it can be seen that satisfactory properties are achieved.

In addition, the bottle can be transferred rapidly without deforming or tilting. Also, the bottle having a complex base can be transferred rapidly without distortion of the base due to internal pressure.

Modulus, yield stress, yield strain, ultimate strength and ultimate elongation were measured as defined in ASTM Standard D-638. Density was determined by ASTM 1505.

The onset-of-shrinkage temperature referred therein was determined as described in Brady and Jabarin, "Thermal Treatment of Cold-Formed Poly(Vinyl Chloride)", Polymer Engineering and Science, pp. 686-90 of Vol. 17, No. 9, September 1977, except that the samples were cut from the sidewalls of the bottles. When inherent viscosity is referred to herein, it is the viscosity as measured in a 60/40 weight ratio phenol/-tetrachloroethane solution at 25° C.

Thus, in accordance with the invention, the method for making a partially crystalline, biaxially oriented heat set hollow plastic container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at heat setting temperature, expanding the plastic parison within the hot mold and mold base by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, lower the internal pressure in the container, opening the hot mold while maintaining engagement of the open end and engagement of the mold base with the blown hollow container, maintaining a lower internal pressurization of the container to prevent significant shrinkage, and cooling the container while maintaining engagement of the open end and engagement of the mold base with the container and maintaining pressure in the container at least sufficient to prevent shrinkage.

By maintaining engagement of the neck and bottom of the blown hollow article or container as it is moved between stations B and C, distortion of the article and any tendency of the container to tilt relative to the neck or finish is eliminated. Therefore, the cycle time can be substantially decreased by transferring the container from the hot mold to the cold mold more rapidly and thereby decreasing the transfer time. Where the article has a heavy bottom or complex base, such as in free standing containers, distortion of the bottom due to internal pressure is prevented.

The method can be utilized with a hot mold and a cold mold wherein the cold mold is larger than the hot mold, as described in the aforementioned U.S. Pat. No. 4,522,779; or wherein the cold mold has the same volume as the hot mold, or smaller volume, as described in the above identified pending U.S. application Ser. No. 923,503, which is incorporated herein by reference.

If desired, an axial stretch may be applied to the parison by use of a stretch rod either before expanding the parison or simultaneously with the expanding of the parison, as is well known in the art.

Although the invention preferably utilizes a hot mold and a cold mold, some of the advantages are obtained wherein the cooling is achieved without the use of a cold mold while maintaining internal pressurization and engagement of the mold base with the bottom of the container while cooling the container, as described in U.S. Pat. Nos. 4,476,100 and 4,512,948, which are incorporated herein by reference.

Although the method has been described by utilizing parisons which are heated and then blown and heat set, some of the advantages are also applicable to heat setting previously blown containers which are positioned between the halves of a hot mold at station B to heat set the container and then transferred to a cold mold at station C while maintaining engagement of the neck and bottom.

Where the method of U.S. Pat. No. 4,522,779 is utilized, the resultant container exhibits improved mechanical properties but will have lower onset-of-shrinkage and reduced hot filling capability. The container can be utilized when the contents are pressurized.

Where the method of U.S. application Ser. No. 923,503 is utilized, the resultant container will have a higher onset-of-shrinkage temperature and therefore the container can be hot filled at higher temperatures.

We claim:

1. A method for making a partially crystalline, biaxially oriented heatset hollow plastic container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, said mold being at heatsetting temperature, expanding said plastic parison within said hot mold and mold base by internal pressurization through the clamping and blow pin assembly to induce biaxial orientation of the plastic parison and force the plastic parison into intimate contact and conformance with the hot mold and to maintain contact by such internal pressurization between the mold and the biaxial oriented container for a time sufficient to induce partial crystallization in the biaxial oriented container, reducing the internal pressurization of the container, thereafter opening the hot mold while maintaining engagement of the open end of the hot blown container and maintaining engagement of the mold base with the hot blown hollow container, maintaining a lower internal pressurization of the container to prevent significant shrinkage, and maintaining engagement of the mold base with the hot blown container to prevent distortion of of the base of the container when the hot mold is opened, and cooling the container while maintaining engagement with the open end of the hot blown container and maintaining engagement with the base of the hot blown container and mainaining a lower internal pressurization.

2. The method set forth in claim 1 wherein said cooling is achieved by enclosing a cold mold about the mold base and the container while maintaining engagement with the open end of the hot blown container and maintaining engagement with the base of the hot blown container to prevent distortion of the base of the container by the internal pressurization during the cooling and maintaining internal pressurization to maintain contact between the cold mold and the biaxially oriented container.

3. The method set forth in claim 2 wherein said plastic comprises polyethylene terephthalate, said hot mold being at a temperature ranging between about 120° C. and 250° C. and said cold mold being at a temperature ranging between about 1° C. and 100° C.

4. The method set forth in claim 2 wherein the plastic material comprises polyethylene terephthalate and the heat setting parameters comprise:

| Heatset temperature | 120–250° C. |
|---|---|
| Heatset time | 1–10 seconds |
| Transfer pressure | 1–30 p.s.i. |
| Transfer time | 0.8–15 seconds |
| Quench temperature | 1–100° C. |
| Quench time | 0.5–10 seconds |

5. the method set forth in claim 1 wherein said cooling is achieved by external cooling of the container while maintaining engagement of the mold base with the hot blown container and maintaining engagement of the open end of the hot blown container and maintaining internal pressurization such that distortion of the base of the container by the internal pressurization is prevented during the cooling.

6. A method for making a partially crystalline, biaxially oriented heatset hollow plastic container from a hollow parison having an open end and a closed end comprising engaging the open end of a plastic parison which is at a temperature within its molecular orientation temperature range by a clamping and blow pin assembly, positioning a mold base in axial alignment with said engaged hot parison, enclosing a hot mold about the mold base, said mold being at heatsetting temperature, expanding said plastic parison within said hot mold and mold base by internal pressurization through the clamp and blow pin assembly to induce biaxial orientation of the plastic parisons force the plastic parison into intimate contact and conformance with the hot mold and to maintain contact by such internal pressurization between the mold and the biaxial oriented container for a time sufficient to induce partial crystallization in the biaxial oriented container, reducing the internal pressurization of the hot blown hollow container, thereafter opening the hot mold while maintaining engagement of the mold base with the base of the hot blown hollow container and the clamping and blow pin assembly with the open end of the hot blown hollow container, such as to prevent distortion of the base of the container by the internal pressurization when the hot mold is opened, maintaining a lower internal pressurization of the container to prevent significant shrinkage, and transferring the biaxially oriented hot container to a position adjacent an open cold mold which is at a temperature substantially less than the temperature of the hot mold by relatively moving the mold base and the clamping and pin assembly from a position adjacent the open hot mold to a position adjacent the open cold mold while maintaining the reduced internal pressurization at least sufficient to prevent shrinkage, and maintaining engagement of the mold base with the base of the hot blown container to prevent distortion or tilting of the container relative to said open end of the container during relative movement, enclosing the container in the cold mold by closing the cold mold about the mold base and the clamping and blow pin assembly which are in engagement with the hot blown container, holding the container against the confines of the cold mold by maintaining internal pressurization for a time sufficient to prevent shrinkage, exhausting the pressure from the container, opening the cold mold, removing the container, and moving the mold base and the clamping and blowing pin assembly relative to the hot mold and cold mold to bring the mold base and clamping and blow pin assembly into position adjacent the hot mold.

7. The method set forth in claim 6 wherein said relative movement between the mold base and clamping and blow pin assembly is achieved by moving the mold base and the clamping and blow pin assembly between the hot mold and cold mold and maintaining the hot mold and the cold mold stationary.

8. The method set forth in claim 6 wherein said relative movement between the mold base and clamping and blow pin assembly and the hot mold and cold mold is achieved by moving the hot mold and the cold mold relative to the mold base and the clamping and blow pin assembly while maintaining the mold base and the clamping and blow pin assembly stationary.

9. The method set forth in claim 6 including the step of moving the mold base axially toward the clamping and blow pin assembly before closing the hot mold about the hot parison and the step of moving the mold base axially away from the clamping and blow pin assembly after the cold mold is opened and maintaining the mold base in the latter position during the relative movement to bring the mold base and the clamping and blow pin assembly to the position adjacent the hot mold.

10. The method set forth in claim 6 including the step of heating the hot parison to the molecular orientation temperature and the step of transferring the hot parison to a position adjacent the hot mold for engagement by the clamping and blow pin assembly.

11. The method set forth in claim 6 wherein said plastic comprises polyethylene terephthalate, said hot mold being at a temperature ranging between about 120° C. and 250° C. and said cold mold being at a temperature ranging between about 1° C. and 100° C.

12. The method set forth in claim 6 wherein the plastic material comprises polyethylene terephthalate and the heat setting parameters comprise:

| Heatset temperature | 120–250° C. |
| Heatset time | 1–10 seconds |
| Transfer pressure | 1–30 p.s.i. |
| Transfer time | 0.8–15 seconds |
| Quench temperature | 1–100° C. |
| Quench time | 0.5–10 seconds |

13. The method set forth in claim 6 including the step of increasing the internal pressurization of the container after the cold mold is closed to a higher pressure than the transfer pressure in order to provide intimate cooling contact between the container and the cold mold.

14. A method for making a partially crystalline, biaxially oriented heatset hollow plastic container from a hollow parison having an open end and a closed end comprising heating a hot plastic parison at a conditioning station to a temperature within its molecular orientation temperture, transferring said hot parison to a position adjacent a hot mold at a blowing and heatsetting station, engaging the open end of a plastic parison which is at a temperature within its molecular orientation temperature range by a clamping and blow pin assembly, positioning a mold base in axial alignment with said engaged hot parison, enclosing a hot mold about the mold base, said mold being at heatsetting temperature, expanding said plastic parison within said hot mold and mold base by internal pressurization through the clamp and blow pin assembly to induce biaxial orientation of the plastic parison, force the plastic parison into intimate contact and conformance with the hot mold and to maintain contact by such internal pressurization between the mold and the biaxial oriented container for a time sufficient to induce partial crystallization in the biaxial oriented container, reducing the internal pressurization of the container, thereafter opening the hot mold while maintaining engagement of the mold base with the base of the hot blown hollow container and maintaining engagement of the clamping and blow pin assembly with the open end of the hot blown hollow container such as to prevent distortion of the base of the container by the internal pressurization when the hot mold is opened, maintaining a lower internal pressurization of the container to prevent significant shrinkage, and transferring the biaxially oriented container to a position adjacent an open cold mold at a cooling station, by relatively moving the mold base and clamping and pin assembly from a position adjacent the open hot mold to the position adjacent the open end mold while maintaining the reduced internal pressurization at least sufficient to prevent shrinkage, said cold mold being at a temperature substantially less than the temperature of the hot mold and maintaining engagement of the mold base with the base of the hot blown container to prevent distortion or tilting of the container relative to said open end of the container during the relative movement, enclosing the container in the cold mold by closing the cold mold about the mold base and clamping and blow pin assembly which are in engagement with the hot blown container, holding the container against the confines of the cold mold by maintaining internal pressurization for a time sufficient to prevent shrinkage, exhausting the pressure from the container, opening the cold mold, removing the container, and moving the mold base and clamping pin assembly relative to the hot mold and cold mold to bring the mold base and clamp pin assembly into position adjacent the hot mold.

15. The method set forth in claim 14 wherein said relative movement between the mold base and clamping and blow pin assembly is achieved by moving the mold base and clamp and blow pin assembly between the hot mold and cold mold and maintaining the hot mold and cold mold stationary.

16. The method set forth in claim 14 wherein said relative movement between the mold base and clamping and blow pin assembly and the hot mold and cold mold is achieved by moving the hot mold and cold mold relative to the mold base and the clamping and blow pin assembly and maintaining the mold base and clamping and blow pin assembly stationary.

17. The method set forth in claim 14 including the step of moving the mold base axially toward the clamping and blow pin assembly before closing the hot mold about the hot parison and the step of moving the mold plate axially away from the clamping and blow pin assembly after the cold mold is opened and maintaining the mold base in the latter position during the relative movement to bring the mold base and clamping and blow pin assembly to the position adjacent the cold mold.

18. The method set forth in claim 14 wherein said plastic comprises polyethylene terephthalate, said hot mold being at a temperature ranging between about 120° C. and 250° C. and said cold mold being at a temperature ranging between about 1° C. and 100° C.

19. The method set forth in claim 14 wherein the plastic material comprises polyethylene terephthalate and the heat setting parameters comprise:

| | |
|---|---|
| Heatset temperature | 120–250° C. |
| Heatset time | 1–10 seconds |
| Transfer pressure | 1–30 p.s.i. |
| Transfer time | 0.8–15 seconds |
| Quench temperature | 1–100° C. |
| Quench time | 0.5–10 seconds |

20. The method set forth in claim 14 including the step of increasing the internal pressurization of the container after the cold mold is closed to a higher pressure than the transfer pressure in order to provide intimate cooling contact between the container and the cold mold.

* * * * *